May 21, 1929.  A. ROUILLER  1,713,921
APPARATUS FOR ENABLING LONG ENDLESS BANDS OF FLEXIBLE
MATERIAL TO BE CIRCULATED IN REDUCED SPACES
Filed March 5, 1926  2 Sheets-Sheet 1

Inventor
Albert Rouiller
By (signature) Atty.

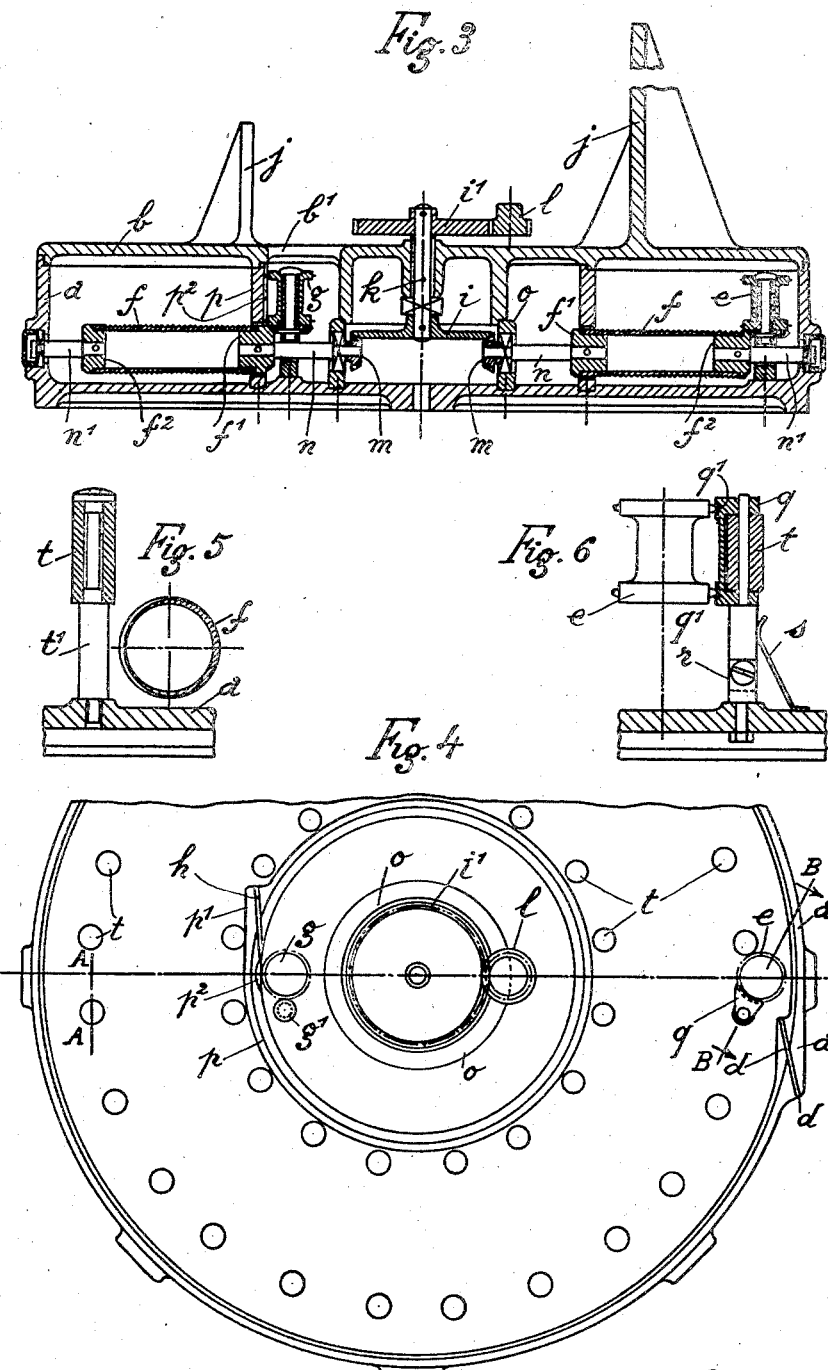

Patented May 21, 1929.

1,713,921

UNITED STATES PATENT OFFICE.

ALBERT ROUILLER, OF PARIS, FRANCE.

APPARATUS FOR ENABLING LONG ENDLESS BANDS OF FLEXIBLE MATERIAL TO BE CIRCULATED IN REDUCED SPACES.

Application filed March 5, 1926, Serial No. 92,464, and in France April 4, 1925.

This invention relates to an apparatus for enabling a long endless band of flexible material to be circulated in a reduced space, such for instance as a film for cinematographic projections, both ends of the band being connected after its engagement in said apparatus. In this manner, the film coils and uncoils simultaneously after its passage in the projecting apparatus without the aid of the rolling devices or stretching rollers generally used. The film circulates under a slight tension and consequently all wear and tear of the band, in the case of a film, caused by distortion of its perforations is avoided and the life of the film that is the number of projections thus made possible is increased.

According to the invention the apparatus comprises essentially a casing provided with passages for the entry and exit with feed rollers in which are placed horizontal rotary rollers in the shape of a star provided with a spiral groove and having at the bottom of the thread a circumferential velocity equal to that of the feed rollers in such a manner that when the system operates, the band coils without jamming in the shape of a regular spiral having a constant pitch.

In order that the invention may be clearly understood, it will now be described with reference to the accompanying drawings in which:

Fig. 3 is a diametrical section of a preferred form of execution of the apparatus, the inner guides being omitted.

Fig. 4 is a part plan view with the cover and the supporting screws removed.

Figs. 5 and 6 are detail sectional views on line A—A and B—B of Fig. 4 respectively.

Figure 1:
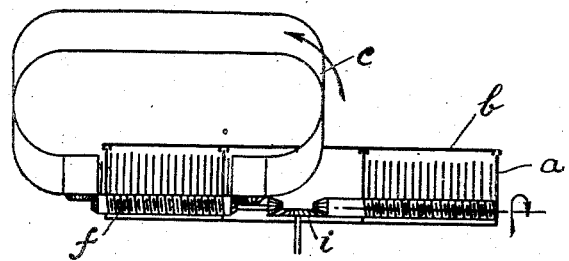
Fig. 1 shows a diagrammatic cross section of the apparatus and Fig. 2 is a diagrammatic plan view.
Figure 2:
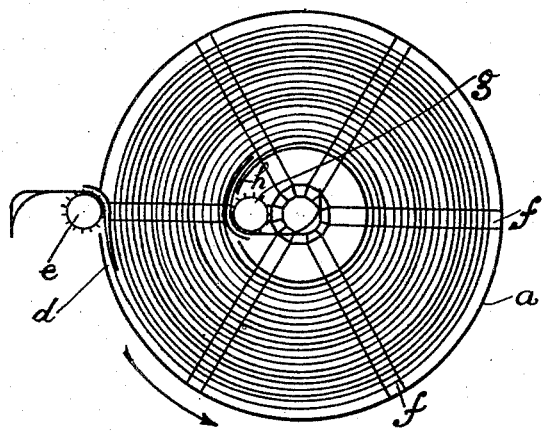

As will be seen in Figs. 1 and 2, the apparatus consists in a barrel $a$ closed by means of a cover $b$ provided with baffles ensuring the comparative air tightness of the interior. The band $c$ which is provided with perforations at regular intervals enters the apparatus by a very narrow passage $d$. An admission cylinder $e$ provided with teeth corresponding to the perforations in the band drives the latter in the passage. In the interior of the apparatus the lower end of the band rests on a certain number of screw threaded rotary rods $f$. These rods have, at the bottom of the thread, a positive circumferential velocity in the same direction as and equal to the velocity imparted to the band.

The band, as previously stated, takes the form of a spiral in the apparatus, and the pitch of the spiral is equal to that of the screw threaded rods $f$.

Where it leaves the apparatus, the band is pulled by a toothed cylinder $g$ and passes through a tight passage $h$. The ends of the band are suitably joined together by means of an adhesive for instance and it will be seen that after passing the position of use a first time the band returns to the entrance of the apparatus and the same cycle continues.

The moving parts may be actuated by gear wheels driven by a device $i$ of any description.

In the preferred mode of execution shown in Figs. 3 to 6 the apparatus consists of a metal barrel $a$ of aluminium for instance upon which is adapted in an air tight manner a cover $b$ provided on its sides with ribs $j$ for the fixing of the projecting apparatus. The cover $b$ is provided in its middle portion with a depending bored bearing designed to receive an axis $k$ upon which are keyed a gear wheel $i^1$ actuated by a pinion $l$ and an inner bevel gear $i$ for transmitting said motion to bevel gears $m$, the axes $n$ of which rotate on the one part in bearings formed in a ring $o$ provided in the barrel, their back portion engaging on the other part the plugs $f^1$ of tubes provided with a circular screw thread forming the bearing screws $f$. The end plugs $f^2$ are also keyed upon axes $n^1$ which rotate in ball bearings arranged in the circumferential wall of barrel $a$.

Two of the screws $f$ placed opposite each other impart their rotary movement for instance by means of equal gears to vertical cylinders provided with two circular rolls of teeth $e$ and $g$, the original diameter of the toothed cylinders being equal to the diameter at the bottom of the thread of the screws. This transmission may be effected for instance as shown by means of toothed plugs. A cylindrical sleeve $p$ provided with a boss $p^1$ having an opening $h$ for the passage of the film is adapted inside the barrel. In the same manner the barrel $a$ carries a boss $a^1$ provided with an opening $d$ in the direction of the serrated admission cylinder $e$. A part $q$ provided with openings $q^1$ opposite the teeth of the cylinder $e$ guides on the other part the passage of the film at that point and causes it to bend slightly so as to ensure a thorough engagement of the teeth. The axis of this device is mounted in a strap $r$ and is in contact with a spring $s$ so as to allow of a slight inclination of the device in the case of a defective travel of the band thus avoiding its destruction. As it exits the film first passes between a cut $p^2$ in sleeve $p$ and the cylinder $g$, and then between the latter which draws it along and a roller $q^1$ similar to roller $q$ and comes out through an opening $b^1$ in cover $b$. The film cage arranged as above indicated between the barrel $a$ and the sleeve $p$ carries a double row of rollers $t$ upon which the end convolutions of the film are engaged and slide. Said rollers are simply mounted as will be seen in Fig. 5 upon axes $t^1$ screwed in the bottom of the frame $a$ one of said rollers being carried when desired as shown in the drawing upon the axis of part $q$.

It will be evident that when the apparatus is in operation, the film entering through passage $d$ at $e$—$q$ will engage inside the bottom of the threads of the rotary screws $f$. It will thus move forward towards the centre,—the direction of the rotary movement of the screws being suitably selected to this effect—, in such a manner that it will coil without friction and without jamming. When the film has been inserted in the receptacle its ends may be connected by an adhesive matter in such a manner that the coil produced by the film is endless and that no handling is necessary in order to effect a new projection of said film. The air tightness of the passages which is due to their small section will preserve the film against all danger of fire inside the apparatus.

It will be understood that I do not limit myself to the particular arrangement hereinbefore specifically described or to the particular type of apparatus shown in the drawings and that for instance an apparatus in which the admission and exit cylinders are smooth and lined with india rubber may be constructed without departing from the principle of my invention this system being adapted for the endless unwinding of a non-perforated band.

Having thus described my invention I declare that what I claim and desire to secure by Letters Patent of the United States is:

1. An apparatus for permitting the accomodation and free circulation of a long flexible endless band including an annular casing, an entry passage formed in the outer wall of said barrel, an exit passage provided in the inner wall of same, two cylinders opposite said passages provided with means for feeding the band, and means provided in said barrel for supporting the band and causing it to coil as a spiral without jamming.

2. An apparatus including a casing with inlet and outlet passages, serrated inlet and outlet feed cylinders, a device elastically mounted on its vertical axis in the vicinity of said cylinders and grooves in said device opposite the teeth of the cylinders designed for guiding the engaged band and means provided in the barrel for carrying the band and causing it to be coiled as a regular spiral.

3. An apparatus including a casing with air tight inlet and outlet passages, a toothed feed cylinder at the entry and at the exit, two guides for the band corresponding to said cylinders, screw threaded rotary rollers arranged radially in the barrel, means to rotate said rollers in the same direction relatively to the direction in which the band is fed in the barrel and means for imparting to said rollers a circumferential velocity at the bottom of the thread equal to and in the same direction as the velocity imparted to the band by the feed rollers.

4. An apparatus including a barrel casing, inlet and outlet feed cylinders, carrying screw threaded rollers in the barrel, a middle bevel gear wheel, bevel gears mounted upon the axes of the rollers and engaging with said wheel, intermediary toothed pinions carried upon the axes of a pair of said rollers having the same diameter and toothed pinions equal to the preceding and engaging with same upon the axes of the inlet and outlet feed cylinders.

5. An apparatus including a barrel casing, inlet and outlet feed cylinders and rotary screw threaded cylinders in the barrel having a positive circumferential velocity in the same direction as and equal to the velocity imparted to the band by the feed rollers and vertical rollers mounted freely on their axes for the interior guiding of the end convolutions of the band.

6. An apparatus including a barrel casing, an air-tight cover on said barrel provided with an opening for the passage of the endless band, ribs and flanges integral with said cover for securing a projecting apparatus, inlet and outlet passages in the casing, feed cylinders and guides opposite said passages, screw threaded rotary rollers in the barrel having a positive circumferential velocity in the same direction as and equal to the velocity imparted to the band by the feed rollers and vertical rollers mounted freely on their axes for the interior guiding of the end convolutions of the band.

7. A device for winding photographic or cinematographic film-bands, comprising in combination a number of horizontally and radially disposed rotary rollers of like diameter for supporting a film-band to be wound up, means for rotating all rollers in the same direction and at a uniform speed and forming a spirally wound film-band, and grooves in each roller in which the individual windings of the spirally wound film-band rest and prevent the contact between the individual windings.

8. A device for winding photographic or cinematographic film-bands, comprising in combination a number of horizontally and radially disposed rotary rollers of like diameter for supporting the film-band to be wound-up, a drum of the same diameter as the said rollers and provided with sprockets for engaging the perforations of the film-band and feeding the latter onto the said rollers, means for rotating all rollers in the same direction and at a uniform speed and forming a spirally wound film-band and for rotating the said drum with the same speed as the rollers, and grooves in each roller in which the individual windings of the spirally wound film-band rest and prevent contact between the individual windings.

9. Apparatus comprising a casing, inlet and outlet toothed feed cylinders, screw-threaded rollers on which a picture film is supported on its edge, said rollers mounted in said casing and having a diameter at the bottom of the threads substantially equal to the diameter of the feed cylinders, and gears imparting to the cylinders and rollers substantially the same speed.

10. Apparatus for winding photographic or cinematographic film bands, comprising in combination; a plurality of horizontally and radially disposed rotary rollers of like diameter for supporting the film band, a drum provided with sprockets for engaging in perforations of the film band and feeding the same onto the rollers, means for rotating all the rollers at the same speed and for rotating said drum at substantially the same peripheral speed as the rollers, and grooves in the rollers in which the individual windings of the spirally wound film band rest and prevent contact between the individual windings.

In testimony that I claim the foregoing as my invention, I have signed my name.

ALBERT ROUILLER.